US009107157B2

(12) United States Patent
Li et al.

(10) Patent No.: US 9,107,157 B2
(45) Date of Patent: Aug. 11, 2015

(54) IMPLEMENTING AN ASSISTED CROSS-PROTOCOL ADAPTATION LAYER/CROSS-LAYER CLOCK SYNCHRONIZATION SCHEME

(75) Inventors: Guoqing Li, Portland, OR (US); Bahareh Sadeghi, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,690

(22) PCT Filed: Dec. 22, 2011

(86) PCT No.: PCT/US2011/066752
§ 371 (c)(1),
(2), (4) Date: May 8, 2014

(87) PCT Pub. No.: WO2013/095489
PCT Pub. Date: Jun. 27, 2013

(65) Prior Publication Data
US 2014/0233556 A1    Aug. 21, 2014

(51) Int. Cl.
*H04W 56/00* (2009.01)
(52) U.S. Cl.
CPC ........ *H04W 56/001* (2013.01); *H04W 56/0035* (2013.01)
(58) Field of Classification Search
CPC .......... H04W 56/001; H04W 56/0035; H04W 56/005; H04W 56/0015; H04W 56/00; H04J 3/0685; H04J 3/0638; H04J 3/0658; H04J 3/0697
USPC .............................. 370/350, 395.62, 503, 507
See application file for complete search history.

(56) References Cited

U.S. PATENT DOCUMENTS

2002/0114354 A1* 8/2002 Sinha et al. .................. 370/503
2006/0262814 A1* 11/2006 Ungermann et al. ......... 370/503
(Continued)

FOREIGN PATENT DOCUMENTS

WO   WO/2011/074869    *  6/2011
WO      2011/108904 A2    9/2011
WO      2013/095489 A1    6/2013

OTHER PUBLICATIONS

Lee et al., "Method for Synchronizing Clocks in a Communicaiton System", Jun. 23, 2011, Wipo, WO/2011/074869, machine translation.*

(Continued)

*Primary Examiner* — Gary Mui
*Assistant Examiner* — Michael Phillips
(74) *Attorney, Agent, or Firm* — Ellis B. Ramirez; Prass LLP

(57) ABSTRACT

A system and method are provided to streamline at least a clock synchronization process for subsequent WiGig PALs once clocks in a first WiGig PAL transmitter and a corresponding first WiGig PAL receiver are synchronized. The unique layering structure of the WiGig 60 GHz standard affords an opportunity to streamline the clock synchronization process based on relationships between individual WiGig PALs, and that the WiGig PALs are directly on top of the WiGig MAC and PHY layers. A process for assisted cross-PAL/cross-layer clock synchronization affords significant reductions in an amount of time required to synchronize the clocks of multiple WiGig PALs based on leveraging an already synchronized clock pair in a first WiGig PAL transmitter/receiver pair to facilitate the clock synchronization of one or more subsequent WiGig PAL transmitter/receiver pairs.

16 Claims, 3 Drawing Sheets

(56) References Cited

U.S. PATENT DOCUMENTS

| | | |
|---|---|---|
| 2007/0223412 A1* | 9/2007 | Lott .......................... 370/310.1 |
| 2011/0040575 A1* | 2/2011 | Wright et al. ..................... 705/3 |
| 2011/0069652 A1 | 3/2011 | Kakani et al. |
| 2011/0216747 A1* | 9/2011 | Shao et al. ..................... 370/338 |
| 2011/0276711 A1 | 11/2011 | Gong et al. |
| 2012/0082152 A1* | 4/2012 | Baldemair et al. ............ 370/350 |
| 2012/0257642 A1* | 10/2012 | Lee et al. ....................... 370/503 |
| 2013/0223458 A1* | 8/2013 | Bui .............................. 370/503 |

OTHER PUBLICATIONS

International Search Report and Written Opinion received for PCT Patent Application No. PCT/US2011/066752, mailed on Jun. 7, 2012, 9 pages.

International Preliminary Report on Patentability and Written Opinion received for PCT Patent Application No. PCT/US2011/066752, mailed on Jul. 3, 2014, 6 pages.

* cited by examiner

IMPLEMENTING AN ASSISTED CROSS-PROTOCOL ADAPTATION LAYER/CROSS-LAYER CLOCK SYNCHRONIZATION SCHEME

BACKGROUND

1. Field of the Disclosed Embodiments

This disclosure relates to systems and methods for implementing an assisted cross-protocol adaptation layer (cross-PAL)/cross-layer clock synchronization scheme for WiGig communications in WiGig 60 GHz mmWave wireless communication systems.

2. Related Art

The next step in wireless communication is nearing. A first generation of mmWave, such as 60 GHz, wireless communication systems is in the process of being standardized as, for example, the proposed IEEE 802.11ad/WiGig standard. A broad spectrum of products that support mmWave wireless communication are being developed and manufactured.

The Wireless Gigabit Alliance (WiGig) has defined the specification for the 60 GHz MAC and PHY layers. The WiGig MAC/PHY specification enables data rates up to 7 Gbps, which is significantly faster than any data rate available in Wi-Fi networks based on current standards. WiGig systems operate in the 60 GHz frequency band, and have a broader spectrum available than the 2.4 GHz and 5 GHz bands used by existing Wi-Fi communications. This allows wider bandwidths that support faster transmission speeds.

WiGig has defined multiple protocol adaptation layers (PALs) directly on top of the 60 GHz MAC and PHY layers. This is not a wholly new concept in that other standards, such as Wi-Fi, define similar or different protocol adaptation layers that facilitate specific applications over different MAC and PHY layers. FIG. 1 illustrates an example of the currently proposed WiGig layering model. As shown in FIG. 1, multiple PALs 120-150 are specified directly on top of the WiGig 60 GHz MAC layer 110 and the WiGig 60 GHz PHY layer 100. These separate PALs 120-150 provide for optimal support of different types of applications according to the WiGig proposed standards for 60 GHz wireless communication. For example, the recently-developed WiGig Display Extension (WDE) PAL 120 supports wireless transmission of audio/video data via multiple interfaces and offers key audio/video applications, such as transmission of compressed or uncompressed video from a computer or digital camera to an HDTV, a monitor or a projector. The WiGig Serial Extension (WSE) PAL 130 defines high-performance wireless implementations of widely-used computer interfaces over 60 GHz enabling the multi-gigabit wireless connectivity between devices for, for example, USB type data traffic. The WiGig Bus Extension (WBE) PAL 140 supports Peripheral Component Interconnect Express (PCIe) data traffic. A separate Secure Digital Input/Output (SDIO) PAL 150 supports SDIO traffic. Additionally, the WiGig architecture and standards leave open the possibility that other PALs may be specified to support other traffic types as may be defined by WiGig in the future.

In the currently-proposed WiGig systems, there may be multiple PAL layers operating over the WiGig MAC and PHY layers as shown in FIG. 1. Most of the applications running in these WiGig PALs require a level of synchronization between the WiGig PAL transmitter (source device) and the WiGig PAL receiver (sink device) for the individual PALs. Clock synchronization is a process in which a receiver's clock is set to correspond to, and remain the same as, the transmitter's clock.

This synchronization is needed for different purposes in different WiGig PALs and in different WiGig layers in which the clocks may run at different frequencies. For example, in the WiGig 60 GHz MAC and PHY layers 100,110, clock synchronization is provided in an attempt to ensure that the received signals are sampled at a correct time in order to avoid any alias of the transmitted signal being received by the receiver.

In a WiGig WDE PAL, for example, the clock synchronization is required to attempt to ensure that data bits are removed from the WiGig WDE PAL receiver buffer at a same rate (speed) that the data bits are transmitted into the WiGig WDE PAL receiver buffer by the WiGig WDE PAL transmitter. Doing so avoids buffer underflow or overflow to a maximum extent possible in order to maintain fidelity of the data stream and to further attempt to ensure that what the WiGig WDE PAL receiver receives and delivers as an output is substantially identical to what the WiGig WDE PAL transmitter transmitted.

Clock synchronization mechanisms are defined separately and independently for different PALs/layers and the tasks that are carried out by each PAL or PAL related radio on their own.

The process of separate independent clock synchronization for each individual WiGig PAL tends to be laborious and time consuming. The process includes a series, and potentially a large series, of individual time stamps being sent from the transmitter (source) side to the receiver (sink) side with the transmitter and the receiver in a master-slave relationship. The receiver attempts to synchronize its clock to the clock in the transmitter based on the time stamps sent from the transmitter. The time stamps are individual data frames defining a current time for the transmitter. The receiver compares the receiver's time with the transmitted time stamps and makes a correction in slowing down or speeding up the receiver's clock.

In a beginning of the clock synchronization process, the receiver must search for synchronization with the transmitter. In these instances, significantly high numbers of time stamps may be required to confirm synchronization of the receiver's clock with the transmitter's clock. There is a series of comparison and adjustment steps undertaken by the receiver to ultimately confirm clock synchronization for an individual PAL by converging deviations from the time stamps in the receiver to the time stamps themselves.

Once an individual WiGig PAL is synchronized, the process of synchronization needs to be undertaken separately, and through a correspondingly lengthy process as described above, for each individual PAL.

SUMMARY OF THE DISCLOSED EMBODIMENTS

It would be advantageous to find some manner by which to streamline at least the transmitter/receiver clock synchronization process for subsequent WiGig PALs once a clock synchronization process has been completed for a specific first WiGig PAL transmitter clock and a corresponding first WiGig PAL receiver clock. The unique structure of the WiGig 60 GHz standard may afford an opportunity to streamline the process based primarily of the relationships between individual WiGig PALs in the application layer, and the layering structure that places the multiple WiGig PALs directly on top of the WiGig MAC and PHY layers.

In various exemplary embodiments, the systems and methods according to this disclosure may provide a process for assisted cross-PAL/cross-layer clock synchronization to significantly reduce the amount of time required to synchronize the clocks of multiple WiGig PALs.

In various exemplary embodiments, the systems and methods according to this disclosure may provide a mechanism to facilitate the clock synchronization of one or more subsequent WiGig PAL transmitter/receiver pairs based on already synchronized clocks in a first WiGig PAL transmitter/receiver pair.

In various exemplary embodiments, the systems and methods according to this disclosure may separately provide a mechanism to facilitate the clock synchronization of one or more WiGig PAL transmitter/receiver pairs based on already synchronized clocks in a WiGig 60 GHz MAC/PHY radio source side and sink side pair.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an assisted cross-PAL/cross-layer clock synchronization scheme will be described, in detail, with reference to the following drawings, in which.

DETAILED DESCRIPTION OF THE DISCLOSED EMBODIMENTS

Figure 1:
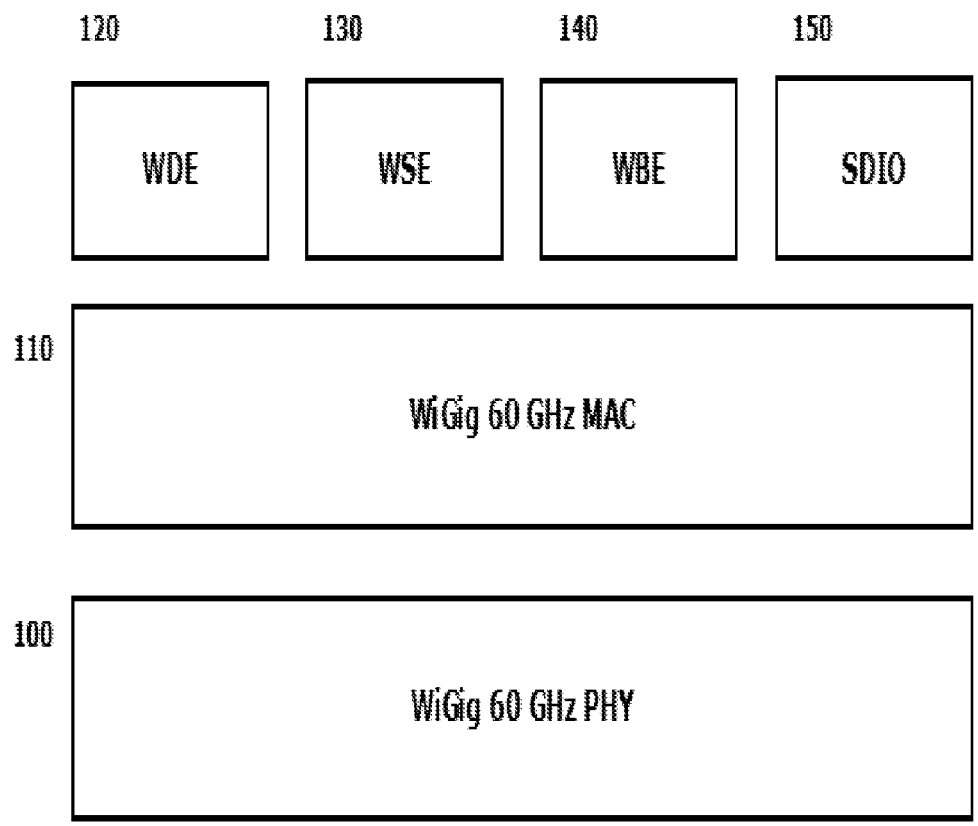
FIG. 1 illustrates the currently proposed layering structure for WiGig 60 GHz communication.

The disclosed systems and methods for implementing an assisted cross-PAL/cross-layer clock synchronization scheme will generally refer to this specific utility for those systems and methods. Exemplary embodiments described and depicted in this disclosure should not be interpreted as being specifically limited to any particular configuration of individual PALs, the clocks of which may be synchronized in virtually any order, as discussed below. The exemplary embodiments should also not be interpreted as being specifically limited to any particular intended use beyond broadly facilitating WiGig data communication by speeding up overall system clock synchronization by leveraging the synchronization of a first pair of transmitter and receiver clocks to streamline the synchronization process for subsequent pairs of transmitter and receiver clocks. This disclosure will describe at least one specific example in which transmitter and receiver clocks supporting a WDE PAL are first synchronized. This first synchronization is then leveraged to streamline the synchronization of transmitter and receiver clocks supporting a WSE PAL. This specific example is described in requisite detail for clarity and ease of understanding of the disclosed concepts. It must be recognized, however, that the systems and methods according to this disclosure are intended to encompass various combinations of cross-PAL assisted clock synchronization, and to encompass, where appropriate, cross-layer assisted clock synchronization, as generally described below.

Specific reference to, for example, any particular wireless communicating device or concept, including specifically cooperating communicating devices that operate wirelessly in the mmWave, and particularly 60 GHz, region of the RF spectrum, should be understood also as being exemplary only, and not limiting, in any manner, to any particular class of devices or communication links. For example, reference is made throughout this disclosure to the WiGig WDE and WSE PALs for illustration purposes. Use of others of the WiGig PALs that would benefit from the disclosed concepts is contemplated. The systems and methods according to this disclosure will be described as being particularly adaptable to the above-described function for WiGig 60 GHz mmWave transmitters and receivers based on the unique layering structure provided by the currently proposed WiGig standard, but should not be considered as being limited to only this function or these radios. Other wireless communicating systems that may advantageously employ the concepts for streamlined multi-clock synchronization according to this disclosure should be understood to be a part of this disclosure.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and method steps, and combinations of those elements and method steps, as particularly pointed out in the appended claims. A person skilled in the relevant art will recognize that other components and configurations may be used without departing from the spirit and scope of the subject matter of this disclosure.

Various aspects of the disclosed embodiments relate to a system and a method for implementing an assisted cross-PAL/cross-layer clock synchronization scheme in order to streamline a process for synchronizing multiple separate clocks across multiple communication links in a wireless communication system to lessen a time required to prepare to transmit data via the wireless communication system, as well as a corresponding non-transitory computer-readable medium having recorded on it a program that, when executed by a processor, causes the processor to execute the steps of the method for implementing an assisted cross-PAL/cross-layer clock synchronization scheme.

Generally, the proposed assisted cross-PAL/cross layer clock synchronization process may include the following. Clock synchronization between a transmitter and a receiver pair for a first WiGig PAL, e.g., WDE, may be accomplished according to conventional means through, for example, the transmission of timestamp information by the transmitter, and the adjustment of the clock in the receiver, over multiple iterations, to achieve synchronization of the clock in the WDE PAL receiver with the clock in the WDE PAL transmitter. At the completion of this process, the synchronized WDE PAL transmitter frequency may be represented by a value F1, and the WDE PAL receiver frequency is represented by a value F1'.

It should be understood that each WiGig PAL is specified to operate at a nominal frequency. There will, however, be deviations from these nominal frequencies for each installation. These deviations are accounted for in the clock synchronization processes. The clock synchronization process is, therefore, needed to account for deviations in order to assure fidelity of the WiGig 60 GHz data communication between the specific PAL transmitter and corresponding PAL receiver.

Upon completion of the clock synchronization for the WDE PAL, the WSE PAL transmitter operating at a frequency F2 may measure, or otherwise determine, a frequency offset for the WSE PAL transmitter frequency F2 from the WDE PAL transmitter frequency F1. The WSE PAL transmitter may assign to this frequency offset a value X.

The WSE PAL transmitter may then transmit the frequency offset value X to the WSE PAL receiver. The WSE PAL receiver may receive the transmitted frequency offset value X and references the WDE PAL receiver frequency F1', which is the WDE PAL receiver frequency synchronized to the WDE PAL transmitter frequency F1, as discussed above. With these inputs, the WSE PAL receiver may then set its clock frequency F2' as a function of F1' and X.

It should be understood that, because the WDE PAL transmitter and the WDE PAL receiver are previously synchronized, and because WSE PAL transmitter and the WDE PAL transmitter frequency offset value X is a measurable, or otherwise derivable, value, which is made known to the WSE PAL receiver, the WSE PAL receiver may advantageously employ this frequency offset value X to derive a synchronized clock signal for its clock with respect to the WSE PAL transmitter clock.

According to the above sequence, the subsequent PAL transmitter/receiver clock synchronization may be streamlined to a single step process once a first PAL transmitter/receiver clock synchronization is complete. This proposed process avoids a requirement to execute the lengthy clock acquisition/synchronization process in the second and subsequent PALS once a first PAL has achieved clock synchronization according to known methods. Application of this process may, therefore, result in an overall WiGig system clock synchronization process for multiple transmitter/receiver clock pairs being significantly foreshortened.

The assisted cross-PAL/cross-layer clock synchronization scheme may be repeated according to the above process on a periodic or random basis in order to maintain fidelity of communications between transmitters and receivers associated with each of the PALs/layers.

As indicated above, the exemplary references to the WDE PAL and the WSE PAL in this discussion are undertaken for illustration and context purposes only. Any WiGig PAL or separate WiGig layer, i.e., the radio layer that may be able to advantageously leverage a first transmitter/receiver clock synchronization in order to streamline its own PAL or layer transmitter/receiver clock synchronization process, should be considered to be part of the above discussion. In other words, it should be appreciated that the discussion of the exemplary process above is not intended to be limiting as an only configuration available for the disclosed systems and methods, or for the discussed cross-PAL/cross-layer process.

Figure 2:
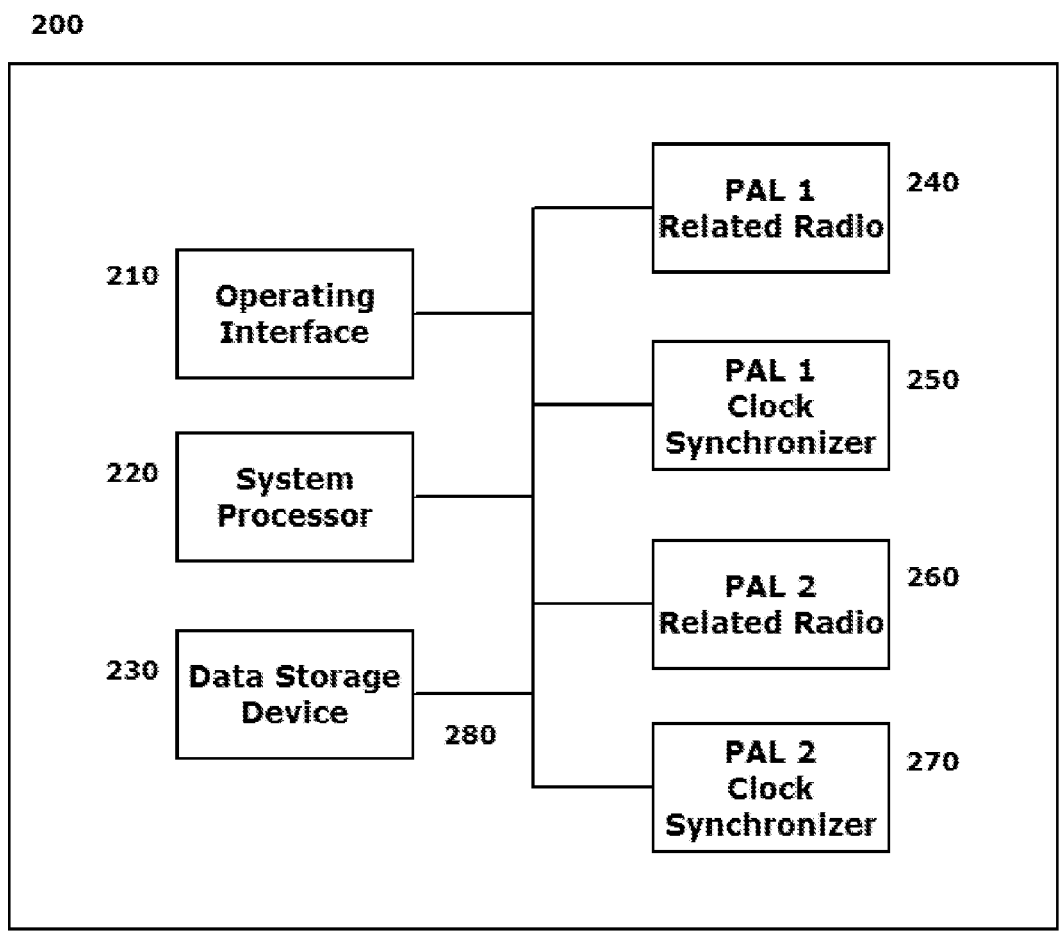
FIG. 2 illustrates a block diagram of an exemplary system for implementing an assisted cross-PAL/cross-layer clock synchronization scheme according to this disclosure.

FIG. 2 illustrates a block diagram of an exemplary system 200 for implementing an assisted cross-PAL/cross-layer clock synchronization scheme according to this disclosure. The exemplary system 200 may be in either of a transmitter (source device) side or a receiver (sink device) side of a WiGig 60 GHz mmWave wireless data communication link.

The exemplary system 200 may include an operating interface 210 by which the system 200 may be manually operated by a user, or automatically operated by an overarching system within which the system 200 is installed according to instructions that may be input to, and interpreted by, the system 200. The operating interface 210 may perform such simple functions as turning on and off the system 200 at appropriate times, or otherwise performing higher level functions such as, for example, initiating first and subsequent clock synchronization processes at a time other than at system start-up, or data communication initiation. The system 200 may make such a determination according to a type of information to be transmitted, or according to which PAL may be used to transfer the information.

The system 200 may include one or more local processors 220 for individually undertaking determination processes that are carried out by the system 200. The processor(s) 220 may provide input to the system 200 regarding implementing a specific data communication scheme over a specific PAL. The processor(s) 220 may separately make a determination regarding whether clock synchronization between a specific PAL transmitter and receiver, or between a specific layer transmitter and receiver has been completed. The processor(s) 220 may carry out processing and control functions for directing one or more PAL clock synchronizers to conduct (1) standard clock synchronization when no PAL or layer transmitter/receiver pair is determined to have completed standard clock synchronization, or (2) assisted cross-PAL/cross-layer clock synchronization when at least one PAL or layer transmitter/receiver pair is determined to have completed standard clock synchronization. Processor(s) 220 may include at least one conventional processor or microprocessor that interprets and implements instructions to make the determinations appropriate to carrying into effect on its own, or via at least one PAL clock synchronizer, the assisted cross-PAL/cross-layer clock synchronization scheme discussed in this disclosure.

The system 200 may include one or more data storage devices 230. Such data storage device(s) 230 may be used to limitedly store data or operating programs as may be appropriate for use in the system 200, and specifically the processor(s) 220. Data storage device(s) 230 may include a random access memory (RAM) or another type of dynamic storage device that stores information and instructions for execution by the processor(s) 220. Data storage device(s) 230 may also include a read-only memory (ROM), which may include a conventional ROM device or another type of static storage device that stores static information and instructions for the processor(s) 220. In these installations, the data storage device(s) 230 may be provided as integral components of the system 200, or otherwise may be provided external to, and in wired or wireless communication with, system 200 such as, for example, in communication with the other components of the system 200 for implementing the assisted cross-PAL/cross-layer clock synchronization scheme, as discussed below.

The system 200 may include at least a WiGig PAL 1 related radio 240 and a WiGig PAL 2 related radio 260. At least one of these radios may be related to a separate underlying layer related radio rather than a separate PAL. Each WiGig PAL 1 and PAL 2 (or separate layer) radio 240,260 may be connected to, or in communication with a separate clock synchronizer 250,270. Otherwise, a clock synchronizer, or a clock synchronizer function, may be integral to each of the related radios. Each WiGig PAL 1 and PAL 2 related radio 240,260 on a transmitter (source) side may establish WiGig 60 GHz data communication with corresponding and respective PAL 1 and PAL 2 related radios on a receiver (sink) side as individual WiGig 60 GHz data communication links.

The system 200 may include, associated with each WiGig PAL/Layer related radio, such as WiGig PAL 1 related radio 240 and WiGig PAL 2 related radio 260 shown in FIG. 2, a PAL/Layer clock synchronizer, such as PAL 1 clock synchronizer 250 and PAL 2 clock synchronizer 270 shown in FIG. 2. Each PAL/Layer clock synchronizer, as a standalone unit, or in cooperation with the processor(s) 220 and/or data storage device(s) 230, may be capable of executing both (1) a standard clock synchronization when no PAL or layer transmitter/receiver pair is determined to have completed standard clock synchronization, and (2) an assisted cross-PAL/cross-layer clock synchronization when at least one PAL or layer transmitter/receiver pair is determined to have completed standard clock synchronization for the WiGig PAL/Layer related radio with which it is associated once a communication link is established between the transmitter (source) side and the receiver (sink) side.

All of the various components of the system 200, as depicted in FIG. 2, may be connected by one or more data/control busses 280. The data/control bus(es) 280 may provide internal wired or wireless communication between the various components of the system 200, whether all of those components are housed integrally as a single unit or are otherwise connected to and in wired or wireless communication with each other.

It should be appreciated that, although depicted in FIG. 2 as an integral unit, the various disclosed elements of the system 200 may be arranged in any combination of sub-systems as individual components or combinations of components, integral to a single unit, or external to, and in communication with the single unit. In other words, no specific configuration as an integral unit or as a support unit, for the system 200 is to be implied by the depiction in FIG. 2. Further, as noted above, certain of the functions described may actually be housed in or carried out by components of an overarching system that the system 200 supports.

The disclosed embodiments may include a method for implementing an assisted cross-PAL/cross-layer clock synchronization scheme. The method may include establishing communication between a source device and a sink device as a first WiGig PAL transmitter and receiver, or a first WiGig layer transmitter and receiver. Conventional clock synchronization may then be undertaken between the first WiGig PAL transmitter and receiver, or the first WiGig layer transmitter and receiver, as communication is established. Based on the length of time that the conventional clock synchronization method takes to complete, the method may monitor that process and wait until that process is complete before proceeding. Once the conventional clock synchronization process between the first WiGig PAL transmitter and receiver, or the first WiGig layer transmitter and receiver, is completed, the method may establish, or otherwise ascertain, a relationship between the first WiGig PAL/Layer source side clock frequency and a second WiGig PAL/Layer source side clock frequency. The method may assign a value to the determined relationship between the frequencies. As communications are then established between the source device and the sink device for the second WiGig PAL/Layer, the method may transmit the assigned value for the determined relationship between the frequencies from the source device to the sink device as the second WiGig PAL/Layer transmitter and receiver. The method may then make reference to the synchronized first WiGig PAL/Layer sink side clock frequency and apply the assigned value to the synchronized first WiGig PAL/Layer sink side clock frequency to obtain a synchronized second WiGig PAL/Layer sink side clock frequency in a streamlined manner.

Figure 3:
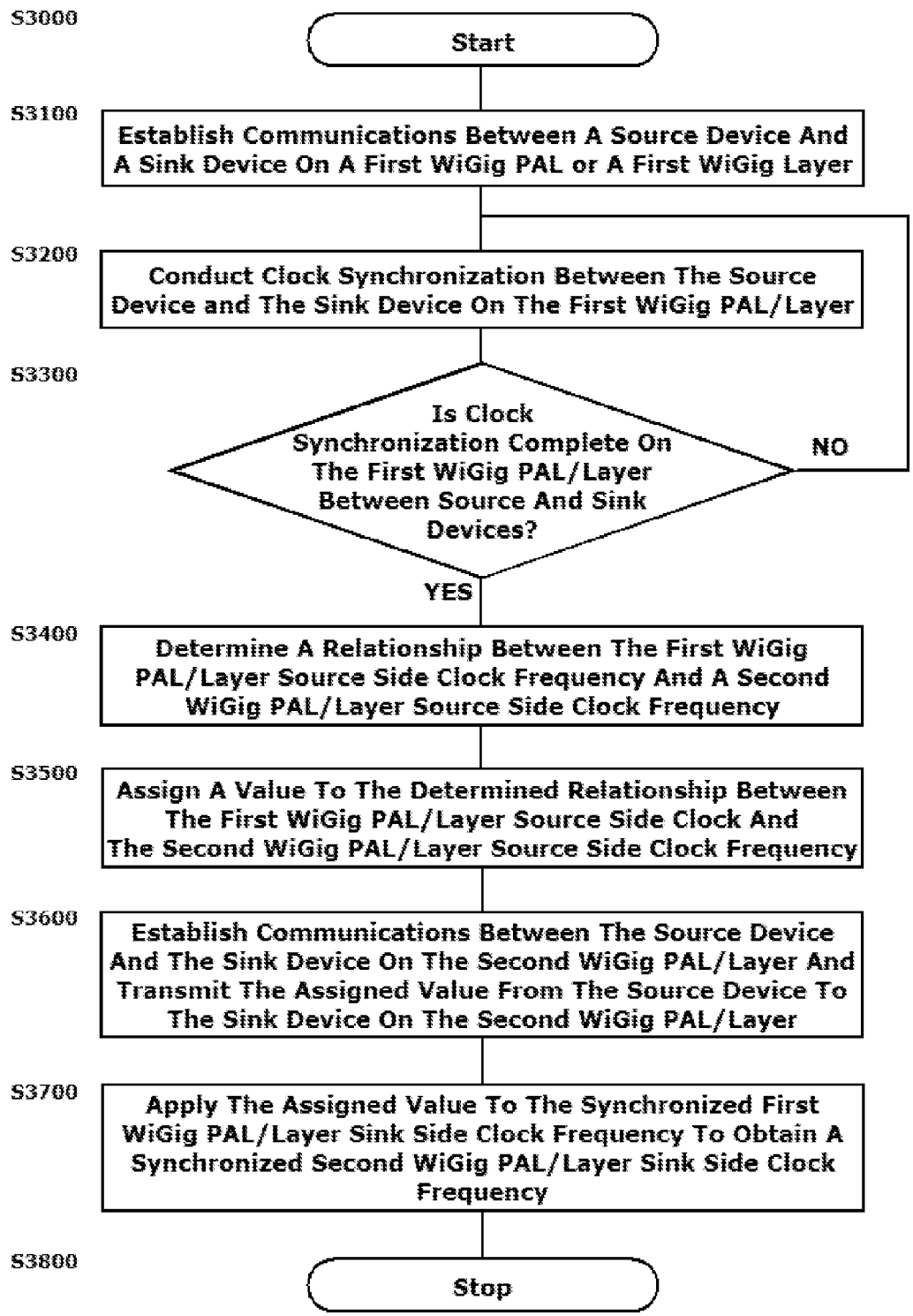
FIG. 3 illustrates a flowchart of an exemplary method for implementing an assisted cross-PAL/cross-layer clock synchronization scheme according to this disclosure.

FIG. 3 illustrates a flowchart of an exemplary method for implementing an assisted cross-PAL/cross-layer clock synchronization scheme according to this disclosure. As shown in FIG. 3, operation of the method commences at Step S3000 and proceeds to Step S3100.

In Step S3100, communication may be established between a source device and a sink device according to a first WiGig PAL or a first WiGig layer. Operation of the method proceeds to Step S3200.

In Step S3200, the source device and the sink device may cooperate to conduct conventional clock synchronization on the first WiGig PAL/Layer. Operation of the method proceeds to Step S3300.

Step S3300 is a determination step. In Step S3300, it may be determined whether the clock synchronization on the first WiGig PAL/Layer according to conventional methods between the source device and the sink device is complete.

If, in Step S3300, it is determined that the clock synchronization on the first WiGig PAL/Layer according to conventional methods between the source device and the sink device is not complete, operation of the method reverts to Step S3200 for completion of the clock synchronization on the first WiGig PAL/Layer according to conventional methods.

If, in Step S3300, it is determined that the clock synchronization on the first WiGig PAL/Layer according to conventional methods between the source device and the sink device is complete, operation of the method proceeds to Step S3400.

In Step S3400, a frequency relationship between the first WiGig PAL/Layer source side clock frequency and a second WiGig PAL/Layer source side clock frequency may be determined. Such a determination may be undertaken by a processor in the source device. Operation of the method proceeds to Step S3500.

In Step S3500, a value may be assigned to the determined frequency relationship between the separate source side clocks. Operation of the method proceeds to Step S3600.

In Step S3600, communication between the source device and the sink device may be established on the second WiGig PAL/Layer and the assigned value for the determined frequency relationship between the separate source side clocks may be transmitted on the second WiGig PAL/Layer. Operation of the method proceeds to Step S3700.

In Step S3700, reference may be made in the sink device to the synchronized first WiGig PAL/Layer clock frequency. The assigned value for the determined frequency relationship between the separate source side clocks may be applied to the synchronized first WiGig PAL/Layer sink side clock frequency to obtain a synchronized second WiGig PAL/Layer sink side clock frequency, thereby completing the clock synchronization process on the second WiGig PAL/Layer in a streamlined manner. Operation of the method proceeds to Step S3800, where operation of the method ceases.

The steps of the above method may be repeated periodically or randomly to employ the assisted cross-PAL/cross-layer clock synchronization scheme in a manner that continuously maintains a fidelity of communications between the multiple transmitters and receivers associated with each of the WiGig PALs/Layers.

The disclosed embodiments may include a non-transitory computer-readable medium storing instructions which, when executed by a processor, may cause the processor to execute the steps of the method as shown in FIG. 3, and as outlined, and described in detail, above.

The above-described exemplary systems and methods reference certain conventional or otherwise known communicating components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described.

Those skilled in the art will appreciate that other embodiments separate from those specifically disclosed may be practiced using the concepts described above and such embodiments should reasonably be considered to be encompassed in the above discussion.

Embodiments may also be practiced in distributed network computing environments where tasks are performed by local and remote processing devices, generally as outlined above, that are linked to each other by hardwired links, wireless links, or a combination of both, through the computing network.

Embodiments within the scope of the present disclosure may include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor to be executed by the processor when the processor is caused to communicate in a network environment.

The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

We claim:

1. A method for implementing a streamlined clock synchronization scheme for multiple wireless communication links, comprising:
    synchronizing a first source device clock and a first sink device clock for a first wireless communication link between a source device and a sink device;
    wherein the source device communicates on multiple PALs or multiple layers in a WiGig 60 GHz layered data structure;
    wherein the sink device communicates on the multiple PALs or the multiple layers in the WiGig 60 GHz layered data structure with the source device;
    determining, with a processor, a relationship between a frequency of the first source device clock for the first wireless communication link and a second source device clock for a second wireless communication link;
    communicating information regarding the determined frequency relationship via the second wireless communication link between the source device and the sink device;
    applying the information regarding the determined frequency relationship to frequency information derived from the first sink device clock to synchronize a second sink device clock to the second source device clock; and
    determining, with the processor, the relationship, and direct the communicating of the information and the applying of the information on a random basis to maintain fidelity of the first and second wireless communication links.

2. The method of claim 1, the first wireless communication link and the second wireless communication link being wireless communication links established according to separate layers in a WiGig 60 GHz structure.

3. The method of claim 1, the first wireless communication link and the second wireless communication link being wireless communication links established according to separate PALs in a WiGig 60 GHz structure.

4. The method of claim 1, the determining of the relationship, the communicating of the information and the applying of the information being repeated for at least a third wireless communication link.

5. The method of claim 1, the determining of the relationship, the communicating of the information and the applying of the information being repeated periodically to maintain fidelity of the first and second wireless communication links.

6. The method of claim 1, further comprising determining that the synchronizing of the first source device clock and the first sink device clock for the first wireless communication link between the source device and the sink device is completed prior to proceeding with the determining of the relationship, the communicating of the information and the applying of the information.

7. The method of claim 1, further comprising assigning a value to the determined frequency relationship, the communicating of the information regarding the determined frequency relationship comprising transmitting the assigned value for the determined frequency relationship to the sink device.

8. The method of claim 7, the applying the of the information regarding the determined frequency relationship comprising applying the assigned value for the determined frequency relationship to the frequency information derived from the first sink device clock to synchronize the second sink device clock to the second source device clock.

9. A system for implementing a streamlined clock synchronization scheme for multiple wireless communication links, comprising:
    a source device that communicates on multiple PALs or multiple layers in a WiGig 60 GHz layered data structure, the source device comprising:
        a first source device clock that supports communication on a first wireless communication link between the source device and a sink device; and
        a second source device clock that supports communication on a second wireless communication link between the source device and the sink device; and
    the sink device that communicates on the multiple PALs or the multiple layers in the WiGig 60 GHz layered data structure with the source device, the sink device comprising:

a first sink device clock that is synchronized with the first source device clock to support the communication on the first wireless communication link; and a second sink device clock that is synchronized with the second source device clock to support the communication on the second wireless communication link; and a processor in at least one of the source device and the sink device that is programmed to determine that the first sink device clock is synchronized to the first source device clock;

determine a relationship between a frequency of the first source device clock and the second source device clock;

direct communicating information regarding the determined frequency relationship via the second wireless communication link between the source device and the sink device and applying the information regarding the determined frequency relationship to frequency information derived from the first sink device clock to synchronize the second sink device clock to the second source device clock; and the processor being further programmed to determine the relationship, and direct the communicating of the information and the applying of the information on a random basis to maintain fidelity of the first and second wireless communication links.

10. The system of claim 9, the first wireless communication link and the second wireless communication link being wireless communication links established according to separate layers in the WiGig 60 GHz layered data structure.

11. The system of claim 9, the first wireless communication link and the second wireless communication link being wireless communication links established according to separate PALs in the WiGig 60 GHz layered data structure.

12. The system of claim 9, the source device further comprising at least a third source device clock that supports communication on a third wireless communication link between the source device and the sink device, the sink device further comprising at least a third sink device clock that is synchronized with the at least third source device clock to support the communication on the third wireless communication link, and the processor being further programmed to determine the relationship, and direct communicating of the information and applying of the information to synchronize the at least third sink device clock to the third source device clock.

13. The system of claim 9, the processor being further programmed to determine the relationship, and direct the communicating of the information and the applying of the information periodically to maintain fidelity of the first and second wireless communication links.

14. The system of claim 9, the processor being further programmed to assign a value to the determined frequency relationship, and to direct transmitting the assigned value for the determined frequency relationship to the sink device.

15. The system of claim 14, the processor being further programmed to apply the assigned value for the determined frequency relationship to the frequency information derived from the first sink device clock to synchronize the second sink device clock to the second source device clock.

16. A non-transitory computer-readable medium storing computer-readable instructions which, when executed by a processor, cause the processor to execute a method for implementing a streamlined clock synchronization scheme for multiple wireless communication links, comprising:

synchronizing a first source device clock and a first sink device clock for a first wireless communication link between a source device and a sink device;

wherein the source device communicates on multiple PALs or multiple layers in a WiGig 60 GHz layered data structure;

wherein the sink device communicates on the multiple PALs or the multiple layers in the WiGig 60 GHz layered data structure with the source device;

determining a relationship between a frequency of the first source device clock for the first wireless communication link and a second source device clock for a second wireless communication link;

communicating information regarding the determined frequency relationship via the second wireless communication link between the source device and the sink device;

applying the information regarding the determined frequency relationship to frequency information derived from the first sink device clock to synchronize a second sink device clock to the second source device clock;

determining that the synchronizing of the first source device clock and the first sink device clock for the first wireless communication link between the source device and the sink device is completed prior to proceeding with the determining of the relationship, the communicating of the information and the applying of the information; and determining the relationship, and direct the communicating of the information and the applying of the information on a random basis to maintain fidelity of the first and second wireless communication links.

* * * * *